(12) United States Patent
Motz et al.

(10) Patent No.: US 7,231,325 B2
(45) Date of Patent: Jun. 12, 2007

(54) SYSTEM FOR EVALUATING A SENSOR SIGNAL

(75) Inventors: Mario Motz, Wernberg (AT); Tobias Werth, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/157,377

(22) Filed: Jun. 21, 2005

(65) Prior Publication Data
US 2006/0009941 A1    Jan. 12, 2006

(30) Foreign Application Priority Data
Jun. 21, 2004    (DE) .................... 10 2004 029 941

(51) Int. Cl.
*G01P 3/42*    (2006.01)
(52) U.S. Cl. ................ 702/189; 73/514.16; 73/514.31; 324/200; 324/219; 324/247
(58) Field of Classification Search ................ 73/1.41, 73/514.16, 514.31, 779; 123/617; 324/200, 324/219, 247; 702/38, 182, 189
See application file for complete search history.

(56) References Cited

U.S. PATENT DOCUMENTS

| | | | | |
|---|---|---|---|---|
| 2,199,192 A | * | 4/1940 | Artzt .................. 330/207 R |
| 3,354,452 A | * | 11/1967 | Bard et al. .................. 341/140 |
| 3,435,332 A | | 3/1969 | Kurdyla |
| 3,597,678 A | | 8/1971 | Fearon .................... 324/37 |
| 3,617,717 A | * | 11/1971 | Smith ...................... 700/8 |
| 3,943,434 A | | 3/1976 | Haeusler et al. ............ 323/69 |
| 3,969,683 A | * | 7/1976 | Fabricius .................. 330/144 |
| 4,293,814 A | * | 10/1981 | Boyer .................... 324/166 |
| 4,316,155 A | | 2/1982 | Hanisko .................... 331/18 |
| 4,578,692 A | | 3/1986 | Higgs et al. .............. 357/27 |
| 4,705,964 A | | 11/1987 | Higgs .................... 307/278 |
| 4,982,155 A | | 1/1991 | Ramsden ................ 324/207.2 |
| 5,103,675 A | * | 4/1992 | Komninos .................. 73/592 |
| 5,126,684 A | * | 6/1992 | Solomon .................. 330/10 |
| 5,146,154 A | | 9/1992 | Lippmann et al. .......... 323/367 |
| 5,212,456 A | | 5/1993 | Kovalcik et al. .......... 330/261 |
| 5,218,298 A | | 6/1993 | Vig ...................... 324/251 |

(Continued)

FOREIGN PATENT DOCUMENTS

DE        19701261 C2    7/1997

(Continued)

OTHER PUBLICATIONS

"Differential Hall Sensor", Infineon Technologies, TLE4925/TLE4925C, pp. 1-25.

(Continued)

*Primary Examiner*—Edward R Cosimano
(74) *Attorney, Agent, or Firm*—Baker Botts L.L.P.

(57) ABSTRACT

The inventive device for evaluating the sensor signal includes the provider for providing the sensor signal, the processor for processing the sensor signal and for providing an information signal comprising information regarding the amplitude course of the sensor signal and means for comparing the sensor signal to a first and a second comparison value, wherein the first and/or the second comparison value are adjustable based on the information signal such that a difference between the first and the second comparison value comprises a non-linear relation to the amplitude course of the sensor signal.

38 Claims, 6 Drawing Sheets

U.S. PATENT DOCUMENTS

| | | | |
|---|---|---|---|
| 5,220,207 A | 6/1993 | Kovalcik et al. | 307/350 |
| 5,245,262 A | 9/1993 | Moody et al. | 318/560 |
| 5,258,760 A | 11/1993 | Moody et al. | 341/166 |
| 5,371,500 A | 12/1994 | Lippmann et al. | 341/155 |
| 5,389,889 A | 2/1995 | Towne et al. | 330/6 |
| 5,442,283 A | 8/1995 | Vig et al. | 324/207.2 |
| 5,514,901 A | 5/1996 | Peppiette et al. | 257/547 |
| 5,537,388 A * | 7/1996 | Shinskey | 702/86 |
| 5,545,917 A | 8/1996 | Peppiette et al. | 257/547 |
| 5,570,052 A | 10/1996 | Fonderie et al. | 327/205 |
| 5,619,137 A | 4/1997 | Vig et al. | 324/251 |
| 5,621,310 A | 4/1997 | Cosgrove et al. | 324/74 |
| 5,629,622 A | 5/1997 | Scampini | 324/247 |
| 5,650,719 A | 7/1997 | Moody et al. | 324/166 |
| 5,694,038 A | 12/1997 | Moody et al. | 324/207.2 |
| 5,694,039 A | 12/1997 | Alfors | 324/207.2 |
| 5,729,130 A | 3/1998 | Moody et al. | 324/207.12 |
| 5,745,001 A * | 4/1998 | Ueshima et al. | 327/553 |
| 5,910,745 A | 6/1999 | Zarabadi | 327/356 |
| 5,917,320 A | 6/1999 | Scheller et al. | 324/166 |
| 5,942,686 A | 8/1999 | Bhardwaj | 73/504.16 |
| 6,064,199 A | 5/2000 | Walter et al. | 324/207.2 |
| 6,100,680 A | 8/2000 | Vig et al. | 324/207.2 |
| 6,297,627 B1 | 10/2001 | Towne et al. | 324/207.12 |
| 6,356,741 B1 | 3/2002 | Bilotti et al. | 455/90 |
| 6,522,131 B1 | 2/2003 | Hiligsmann et al. | 324/207.2 |
| 2003/0030431 A1 | 2/2003 | Reininger | 324/207.2 |
| 2006/0009941 A1* | 1/2006 | Motz et al. | 702/116 |

FOREIGN PATENT DOCUMENTS

| | | |
|---|---|---|
| DE | 19626596 C2 | 3/2001 |
| DE | 19701262 C2 | 9/2001 |
| DE | 19701261 C2 | 8/2002 |
| DE | 19701260 C2 | 1/2003 |
| DE | 10158836 | 6/2003 |
| DE | 10013196 B4 | 2/2004 |
| EP | 0997705 A2 | 5/1994 |
| EP | 0 670 533 A2 * | 9/1995 |
| JP | 9321230 | 12/1997 |
| WO | 00/14901 | 3/2000 |
| WO | 00/57136 | 9/2000 |

OTHER PUBLICATIONS

Dietmayer, Klaus C.J., "Integrated Online Diagnosis for AMR-based angular measurement systems", *Sensors and Actuators* A 91:12-15.

* cited by examiner

SYSTEM FOR EVALUATING A SENSOR SIGNAL

CROSS-REFERENCE TO RELATED APPLICATION

This application claims priority from German Patent Application No. 10 2004 029 941.2, which was filed on Jun. 21, 2004, and is incorporated herein by reference in its entirety.

TECHNICAL FIELD

The present invention generally relates to a method and a device for evaluating a sensor signal and in particular to switching sensors or magnetic field detection means, respectively, provided in order to detect the relative movement and/or position of a structure of a ferromagnetic or permanent-magnet material for example by detecting the differential flow density of the magnetic field generated or influenced by the structure by means of magnetic field detection elements arranged relative to the movement or rotation direction, respectively, of the providing object (providing structure) and evaluating the same by means of a downstream processing system for processing the sensor signal or the sensor signals, respectively.

BACKGROUND

In the art, already a number of arrangements and applications for so-called switching sensors are known, generally using magnetic field sensors having an associated signal processing circuit in order to for example perform a rotational speed, position or speed determination of a providing object for example also with a simultaneous detection of the movement direction or rotational direction, respectively, of the providing object or for example also a simple distance recognition of the providing object with respect to the sensor arrangement.

One possibility for the determination of the movement direction or movement speed, respectively, known in the prior art is to use two magnetic field sensor elements which are spatially separated from each other and arranged spaced apart from the providing object to be examined. The sensor element signals of the magnetic field sensor elements are here evaluated separate from each other, wherein from the temporal sequence of the signals of the magnetic field sensor elements, for example using a digital signal processing means DSP, the movement direction or the distance of the providing object may be determined. In such an arrangement now, typically in relation to the providing object, e.g. a gearwheel, a so called backbias magnet is used in order to generate a suitable magnetic field influenced by the different teeth (cams) and depressions of the gearwheel, so that the two spaced apart magnetic field sensor elements may provide different sensor signals depending on the position of the individual teeth and the depressions of the gear wheel.

Figure 4:
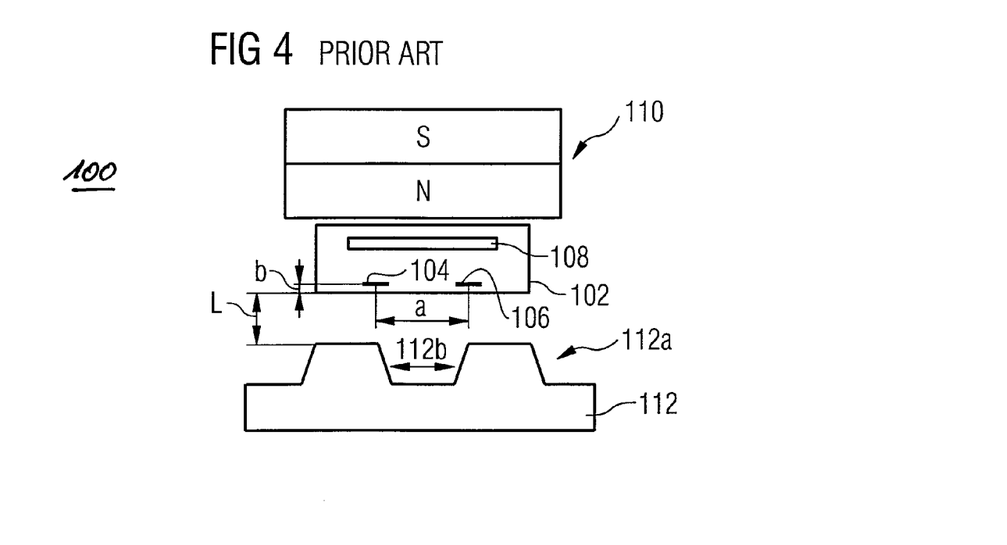
FIG. 4 shows a fundamental illustration of a known switching sensor arrangement according to the prior art.

In FIG. 4 now as an example a schematical illustration of such a Hall sensor arrangement 100 having a switching sensor building block 102 with two Hall elements 104, 106 and an evaluation IC 108 (IC=integrated circuit) is shown as an example. The Hall sensor arrangement 100 further includes a backbias magnet 110 and a gear wheel 112 having teeth 112a (cams) and depressions 112b. The distance L (e.g. 2.5 mm) illustrated in FIG. 4 indicates the distance between the switching sensor building block 102 and the gear wheel 112, the distance a indicates the center distance of the Hall elements 104 and 106 and the distance b indicates the distance of the Hall elements 104, 106 from the exterior housing side of the switching sensor building block 102.

According to the Hall sensor arrangement 100 of FIG. 4 the switching sensor building block 102 detects the movement or the position of a ferromagnetic structure in the form of the teeth 112a and the depressions 112b of the gear wheel 112 by detecting and temporally evaluating the respective magnetic flow density of a magnetic field penetrating the Hall elements 104, 106, which changes according to the respective orientation or position, respectively, of the gear wheel 112. For generating the magnetic field, at the backside of the switching sensor member 102 the so-called backbias magnet 110 including South Pole and North Pole (as indicated) is arranged.

Figure 5:
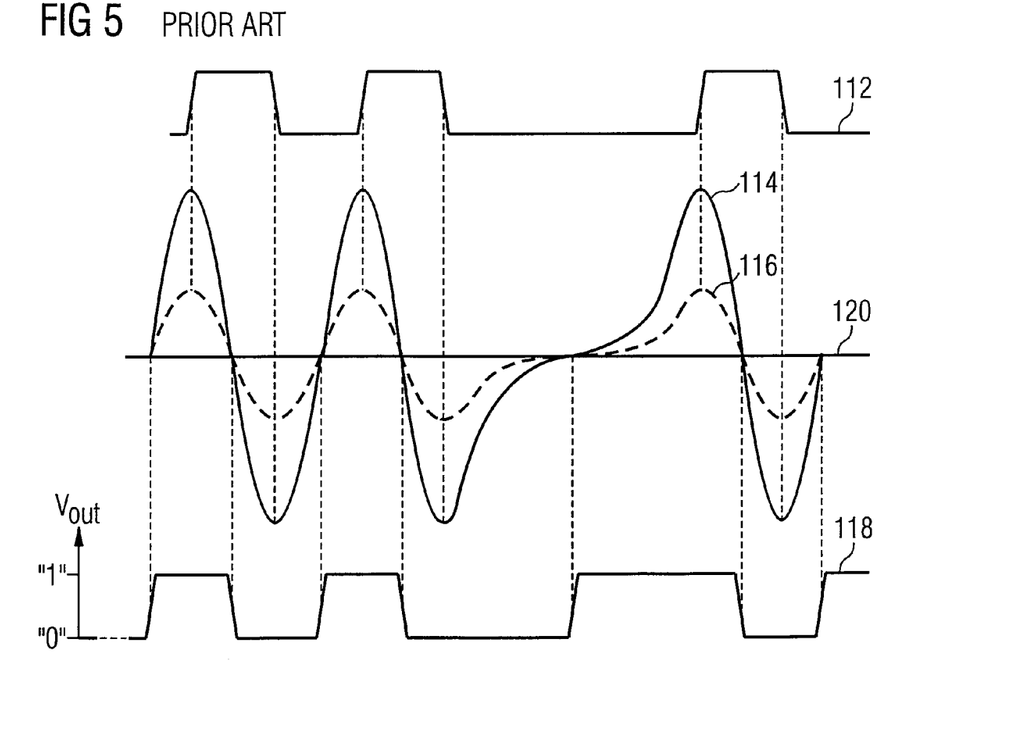
FIG. 5 shows resulting (idealized) differential sensor signal courses in switching sensor arrangements.

In FIG. 5 now, as an example resulting (idealized) sensor signal courses, i.e. differential signal courses are illustrated, obtained as a differential signal of the sensor output signals of the two Hall elements 104, 106. Here, the signal course 114 indicated as a continuous line is to indicate the differential signal for a large airgap between the switching sensor building block 102 and the gear wheel 112, i.e. for a great distance L, and the signal course 116 of the differential signal indicated as a dashed line the one for a small airgap between the switching sensor building block 102 and the gear wheel 112. It becomes clear that the differential signal courses result depending on the respective difference of the magnetic flow density through the two Hall elements 104, 106. Further, in FIG. 5 an output signal $V_{OUT}$ of the switching sensor building block 102 is illustrated as course 118, wherein it may be seen from FIG. 5, that the output signal $V_{OUT}$ comprises a first high logic signal level ("1"), when the differential signal 114, 116 exceeds a mean value 120 of the differential signal, and comprises a second low logic level ("0") when the differential signal course 114, 116 falls below the mean value 120 of the differential signal.

In practice, now for example when using a comparator circuit, problems result in so far that in the switching sensor building block the analog input voltage (i.e. the differential signal or simply the sensor signal) is provided with interference signals and noise components. Such interference signals and noise components are not contained in the idealized illustration of FIG. 5. It may further be seen that due to distance changes between the switching sensor building block 102 and the gear wheel 112 (providing object) for example due to vibrations, distance-depending signal deformations result in the differential signal course 114, 116, i.e. the sensor signal. These undesired interference signal components or signal deformations, respectively, in the sensor signal generally cause an undesired switching of the digital output signal 118 ($V_{OUT}$), which consequently then does not correspond to the actual analog sensor signal anymore. In particular high-frequency interference signals in the analog sensor signal cause a frequent toggling in the comparator circuit and corrupt the digital output signal $V_{OUT}$. A further problem is the thermal drift in particular of the comparator circuit used for a signal comparison, whereby the accuracy of the mapping of the analog input voltage to the digital output signal $V_{OUT}$ suffers.

FIGS. 6a–6d now show different real or normalized sensor signal courses 114, 116, respectively, determined in practical applications at the camshafts with differently sized airgaps between the switching sensor building block 102 and the camshaft (gear wheel) 102.

Figure 6A:
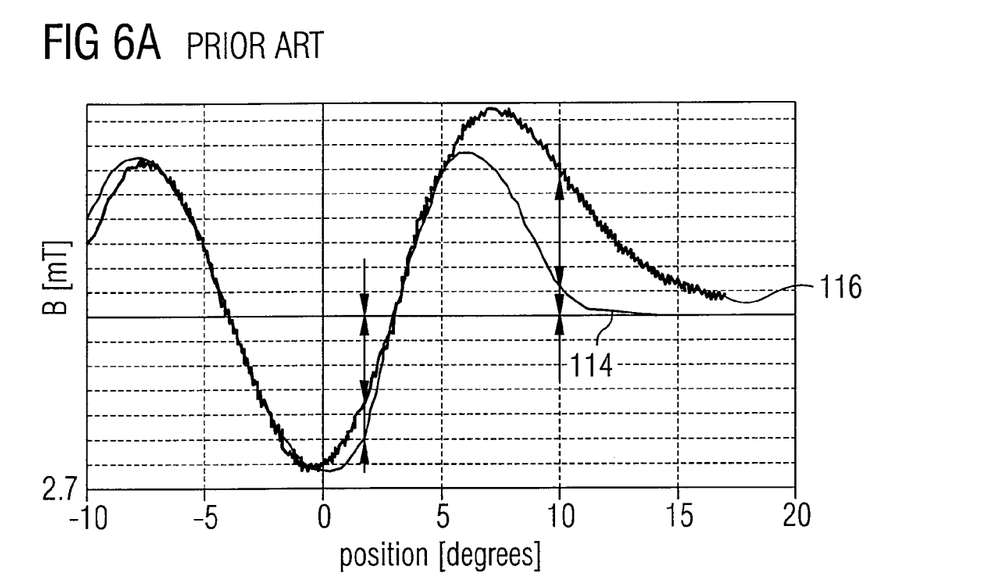
FIGS. 6a–6b show real sensor signal courses determined in practice in differential switching sensor arrangements.

FIG. 6a now shows for example the differential signal courses 114, 116 of a camshaft with differently sized airgaps, wherein FIG. 6a shows the situation in which after several teeth a large (long) depression follows. The signal amplitudes are scaled to 100%.

In FIG. 6a clearly different signal courses 114, 116 for a large airgap (signal course 114) and for a small airgap (signal course 116) may be seen, wherein it is in particular obvious in the signal courses illustrated in FIG. 6a that signal course deviations (see arrows in FIG. 6a) and a changed zero passage with regard to the mean value of the signal courses result. It may thus be seen that in the Hall sensor arrangement 100 different output signals result simply based on a changing airgap between the switching sensor building block 102 and the providing object 112, whereby obviously a correct evaluation of the differential signal courses 114, 116 and thus a correct output signal 118 due to signal shape changes is impaired.

Figure 6B:
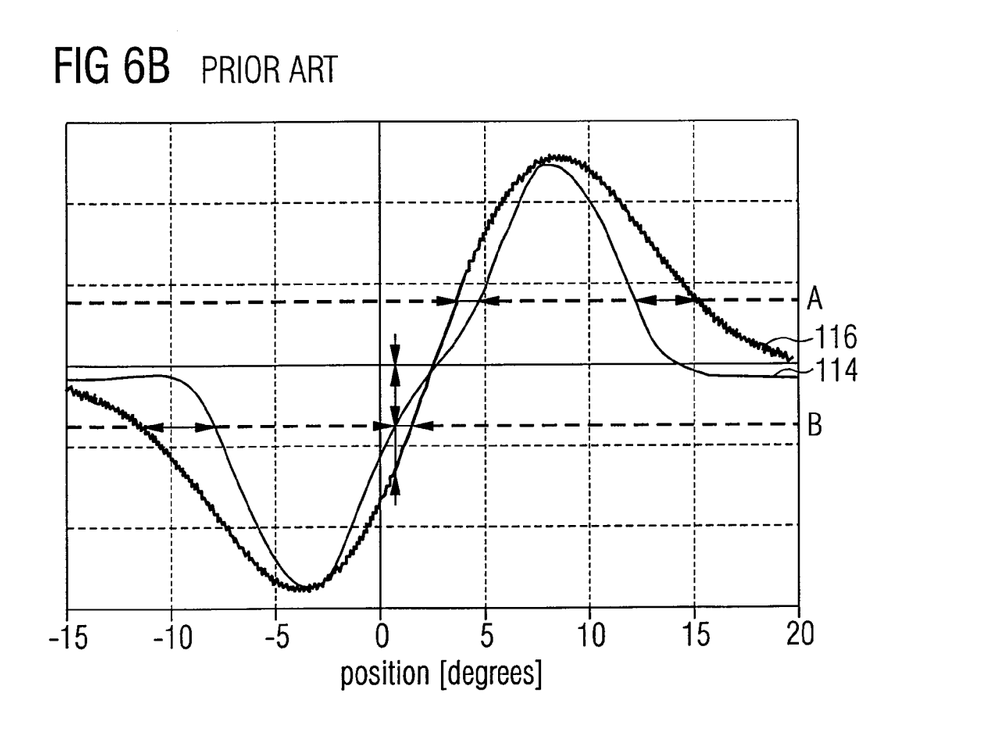

FIG. 6b now shows further differential signal courses 114, 116 of a camshaft sensor with different airgaps, wherein the differential signal courses are normalized to 100%. The differential signal course 114 is an example for a small airgap, wherein the differential signal course 116 is indicated as an example for a large airgap.

Also here the already above indicated signal shape changes of the differential signal courses 114, 116 with different airgaps between the switching sensor building block 102 and the providing object 112 (giver object) are obvious, from which again the already above-mentioned difficulties in the evaluation of the differential signal courses 114, 116 or the output signal 118, respectively, result.

Figure 6C:
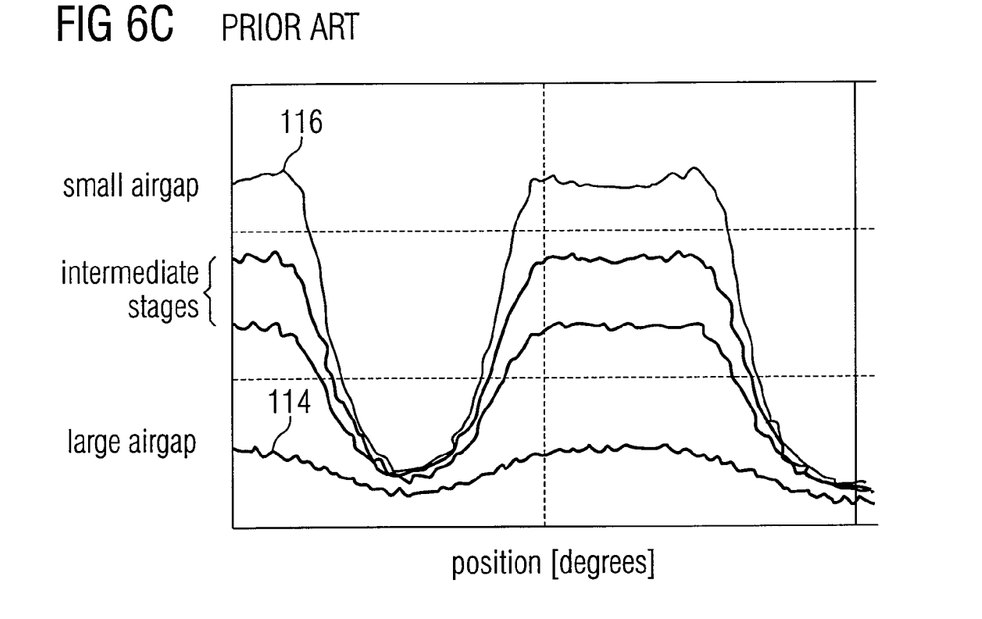
FIGS. 6c–6d show real sensor signal courses determined in practice in mono-cell switching sensor arrangements.

FIG. 6c shows as an absolute signal different signal courses of a so called monocell camshaft sensor operating with only one sensor cell with different airgaps, wherein the x axis indicates the angular position, the y axis indicates the absolute signal amplitude, and as parameters the distance between the switching sensor building block 102 and a providing object (camshaft) are indicated. Also here, the signal course 114 indicates a small airgap, wherein the signal course 116 for example indicates a large airgap. Further, intermediate stages of the signal courses 114, 116 are shown.

Figure 6D:
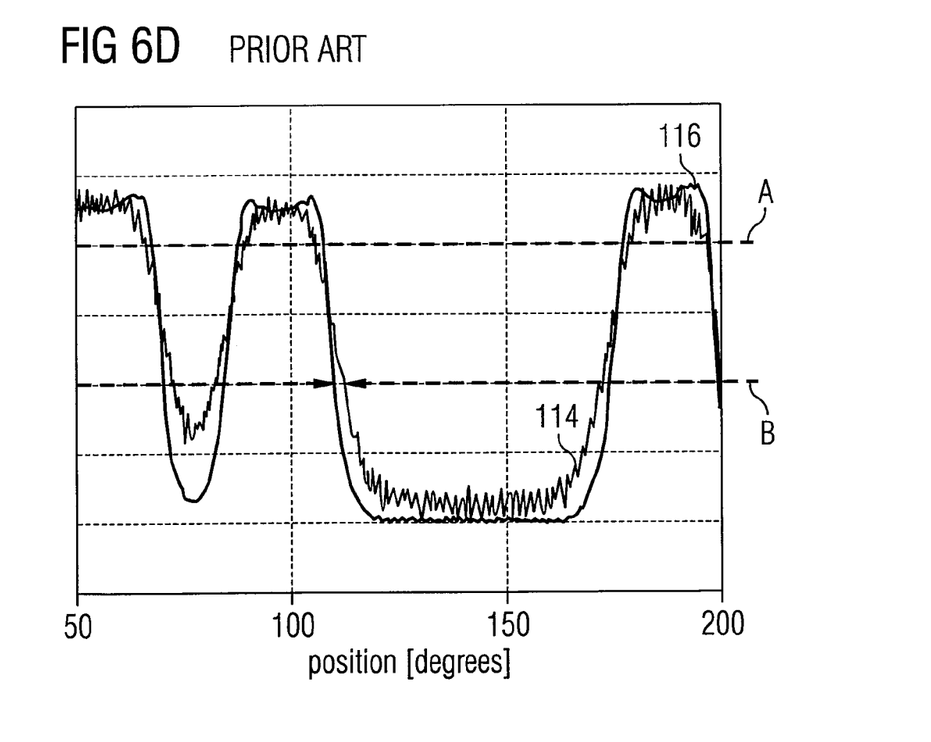

FIG. 6d shows a relative signal of a camshaft sensor with different airgaps, wherein the signal courses are normalized to 100%, wherein the x axis indicates the angular position, the y axis indicates the relative signal amplitude, and as a parameter the distance between the switching sensor building block and the providing object is indicated. Also here, the signal course 114 indicates a small airgap, wherein the signal course 116 for example indicates a large airgap.

In order to prevent the above-indicated problems with regard to signal shape changes of the signal course or the differential signal course and with regard to interference signals and noise components in the signal courses, it is known to provide a comparator circuit with a hysteresis, i.e. with a top and a bottom switching point. Such comparator circuits are also referred to as so-called Schmitt trigger circuits. In these comparator circuits having two threshold values, two comparators are used whose digital output signals are used for setting and resetting a flip flop. By this, the threshold values or switching levels, respectively, of the comparator circuit may be set particularly accurately. Disadvantageous for comparator circuits having a hysteresis, however, is the technically conditioned falling apart of switch-on and switch-off points.

Switch-on and switch-off point here is the switching of the comparator circuit when exceeding a first top threshold value (first hysteresis threshold) in a first change direction of the analog input signal or the falling below the second bottom threshold value (second hysteresis threshold) in a second change direction of the analog input signal, respectively. In order to now be able to filter out interference signals in the analog input signal, the switch-on and switch-off points of the hysteresis should lie as far apart that interference signals cannot cause a switching of the comparator circuit. In other words, the magnitude of the hysteresis determines the measure of the interference suppression, thereby, however, also the deviation from the desired threshold value.

With switching sensor building blocks using a comparator circuit including hysteresis, e.g. Schmitt trigger circuits, like e.g. gear wheel sensors by means of Hall effect elements or xMR effect elements, an undesired phase error with regard to the analog input signal occurs, i.e. the differential signal course, because the analog input signal is subject to or liable to strong amplitude changes and simultaneously also strong signal shape changes, respectively.

According to the prior art it may be concluded, that elements sensitive with regard to magnetic fields are used whose output signals are evaluated, wherein in particular a signal or a differential signal of the output signal courses is examined by one or several magnetic field detection means according to preset switching thresholds. For evaluating the differential signals, comparator circuits with a hysteresis are used, wherein it is problematic here, however, according to the prior art, that the analog input signal (differential signal course) for example based on positioning changes between the detection means (switching sensor building block 102) and the moving structure (gear wheel 112) is subjected to strong amplitude changes due to distance changes and simultaneously also strong signal shape changes.

Arrangements for considering such amplitude or signal shape changes, respectively, were hitherto realized in the prior art for example by means of circuits for adjusting the switching circuits (threshold adjusting circuit, U.S. Pat. No. 6,064,199), in which the signal amplitude peaks of the differential signal course switch the output of the switching sensor building block. Further, according to the prior art, also switching sensor building blocks were realized in which the switching values, i.e. the hysteresis of the comparator circuits, represent a fixed percentage of the peak to peak voltage value of the analog input signal (fixed percentage of peak to peak voltage, U.S. Pat. No. 5,650,719 and U.S. Pat. No. 6,297,627). Further, for example the U.S. patent application U.S. Pat. No. 5,694,039 describes a proceeding in which the switching signal is applied across an amplifier with a programmable gain or amplification (PGA; PGA=programmable gain amplifier) in the main signal path. Further, according to the prior art, also analog sample and hold circuits for a minimum-maximum amplitude localization are for example proposed in the U.S. patent application U.S. Pat. No. 6,100,680.

In the Hall sensor arrangement known in the prior art using comparator circuits having a hysteresis, it is now disadvantageous that the switching sensor building block switches its output signal based on the determined signal peaks (min or max values, respectively) of the signal course of the sensor signal, wherein for this purpose no sharp signal passages of the analog input signal (the differential signal course) are available. By this, in those known Hall sensor arrangements problems with regard to jitter effects and phase errors result. It should further be noted that a switching sensor building block in which the switching thresholds of the hysteresis represent a fixed percentage of the peak to peak input voltage value and the switching points are adjusted accordingly, undesired phase errors may not be prevented by strong amplitude-dependent signal shape changes.

From the signal courses of FIGS. 6a and 6b normalized to a 100% signal amplitude it may be seen that when using an amplitude-proportional hysteresis (e.g. in the shape of lines A, B), the differential signal courses in a proportionally fixed switching value lead to temporal deviations in switching and thus to phase errors. The deviations of the differential signal course illustrated in FIGS. 6a and 6b by arrows in the y-direction, with proportionally fixed switching points which would be represented as horizontal lines A, B in the diagram, lead to different crossings of the differential signal with those proportionally fixed switching points in the x-direction, as it is represented by lines A, B and the associated arrows in FIG. 6b.

Basically the same holds true for the signal courses of a monocell sensor illustrated in FIG. 6d. Also here, however, a proportional switching point may be found, by a crossing of the amplitude-dependent signal courses, which are related to 100%, however. If, however, this point is superimposed by a proportionally fixed hysteresis, then it comes to temporally different passage points in the x-direction and thus to phase errors due to the differential signal course in the y-direction. The superimposed proportionally fixed hysteresis could also be represented as horizontal lines A, B here, deviating from this crossing point in the y-direction and causing a switching of the sensor output signal when the signal passes through these horizontal lines A, B, as it is illustrated by the additionally indicated arrows and lines A, B in FIG. 6d.

Thus, it may be seen from the above-illustrated Hall sensor arrangements according to the prior art that the evaluation of the analog input signal, i.e. the differential signal courses, based on the signals of the Hall elements for determining the position or movement direction, respectively, of the providing object, may not always be performed sufficiently accurately or that this evaluation is very expensive with regard to circuit technology, respectively.

SUMMARY

Based on this prior art it is an object of the present invention to provide an improved concept for the evaluation of a sensor signal, wherein this concept is in particular insensitive with regard to amplitude changes or signal shape changes, respectively, of the provided sensor signal which is to be further processed and evaluated.

In accordance with a first aspect, the present invention provides a device for evaluating a sensor signal, having a provider for providing the sensor signal; a processor for processing the sensor signal and for providing an information signal comprising information regarding the amplitude course of the sensor signal; and a comparator for comparing the sensor signal to a first and a second comparison value; wherein the first and/or the second comparison value are programmable based on the information signal, such that a difference between the first and the second comparison value comprises a non-linear relation to the amplitude course of the sensor signal.

In accordance with a second aspect, the present invention provides a magnetic field sensor arrangement, comprising a device for evaluating a sensor signal according to the above-mentioned device.

In accordance with a third aspect, the present invention provides a method for evaluating a sensor signal, with the steps of processing the sensor signal and providing an information signal comprising information regarding the amplitude course of the sensor signal; and comparing the sensor signal to a first and a second comparison value; wherein the first and/or the second comparison value are programmable based on the information signal such that a difference between the first and the second comparison value comprises a non-linear relation to the amplitude course of the sensor signal.

In accordance with a fourth aspect, the present invention provides a computer program having a program code for performing the above-mentioned method, when the program runs on a computer or a digital signal processor.

In accordance with a fifth aspect, the present invention provides a computer program product having a program code stored on a machine-readable carrier for performing the above-mentioned method for evaluating a sensor signal, when the program product runs on a computer.

In accordance with a sixth aspect, the present invention provides a digital storage medium, in particular a floppy disc, having electronically readable control signals that may cooperate with a programmable computer system or a digital signal processor such that an above-mentioned method for evaluating a sensor signal is performed.

The inventive device for evaluating a sensor signal includes means for providing the sensor signal, means for processing the sensor signal and for providing an information signal comprising information regarding the amplitude course of the sensor signal and means for comparing the sensor signal to a first and a second comparison value, wherein the first and/or the second comparison value may be set based on the information signal such that a difference between the first and the second comparison values comprises a non-linear connection to the amplitude course of the sensor signal.

The inventive magnetic field sensor arrangement comprises the inventive device for evaluating a sensor signal and is preferably implemented as a switching sensor arrangement.

In the inventive method for evaluating a sensor signal, the sensor signal is processed and an information signal is provided comprising information regarding the amplitude course of the sensor signal. Further, the sensor signal is compared to a first and a second comparison value, wherein the first and/or the second comparison value may be set based on the information signal such that a difference between the first and the second comparison value comprises a non-linear connection to the amplitude course of the sensor signal.

The inventive computer program comprises a program code for performing the inventive method for evaluating the sensor signal when the program runs on a computer.

The inventive computer program product comprises a program code stored on a machine-readable carrier for performing the inventive method for evaluating a sensor signal when the program product runs on a computer.

In the inventive digital storage medium, in particular floppy disc, having electronically readable control signals, the same may cooperate with a programmable computer system so that the inventive method for evaluating a sensor signal is performed.

The present invention is based on the finding to process the sensor signal in an evaluation of the sensor signal and in particular in the evaluation of a differential signal course of a magnetic field sensor means, and to provide an information signal comprising information regarding the amplitude course of the sensor signal, and further for example compare the sensor signal to a first and a second comparison value (top and bottom switching threshold) by means of a comparator means, wherein the first and/or the second comparison value are programmable based on the information signal such that a difference between the first and the second comparison value comprises a non-linear connection to the amplitude course of the sensor signal.

In contrast to proceedings known in the art for a sensor signal evaluation, it is now proposed in the present invention report to control the comparison values or the switching thresholds, respectively, and thus the hysteresis of the comparator means "non-linear" to the amplitude course, i.e. for example depending on an amplitude value, effective value or mean value of the input signal and in particular to set the same adaptively.

Due to the arbitrarily programmable non-linearities of the switching thresholds (hysteresis), thus the rather sinusoidal course of the analog input signal with a small amplitude of the same, e.g. with a large airgap between the sensor signal building block and the providing object, and the rather peak-shaped course of the analog input signal or the signal voltage, respectively, with large amplitudes, e.g. with a smaller airgap, may be considered. By this, according to the invention, in particular small phase errors and a reduced signal jitter in the output signal of the signal detection and processing means may be obtained than it was hitherto possible in the art.

According to the present invention, thus the hysteresis size of a comparator arrangement is controlled non-linearly to the amplitude of the analog input signal, wherein the mean value of the input signal for example operates in a side branch of the inventive device for evaluating a sensor signal. Accordingly, the comparison means for comparing the input signal to different comparison values comprises the main branch of the inventive device for evaluating a sensor signal.

According to the present invention, now the "non-linearity" for setting the hysteresis size may be for example realized either via a non-linear analog or digital circuitry, e.g. a digital/analog converter or a non-linear computing circuit.

The main comparator may thus lie in the main branch and provide an output signal separate from the amplitude determination of the sub-signal branch. Here, according to the invention, the switching points or comparison values, respectively, of the main comparator may be readjusted both slowly via several amplitude peak values of the sensor signal to be processed and fast, e.g. with large signal jumps via relatively few amplitude peak values of the sensor signal to be processed. This adjustment is then performed preferably via a digital signal processing portion of the inventive device for evaluating a sensor signal.

In the above-described switching sensor arrangements according to the prior art, fixed switching points or switching points proportionally depending on the amplitude of a comparator circuit are used. In contrast to that, in the present invention, a "non-linearity" depending on the amplitude of the sensor signal for additionally influencing or adaptively setting the comparison values (switching points) of a comparator arrangement, respectively, is used so that according to the invention consequently a non-linear connection between the switching points and the signal amplitude (or amplitude course, effective value, mean value, . . . , respectively) is generated at the comparator arrangement. Here, according to the invention, the "non-linear" switching points may be generated from the mean value of the sensor signal or from a superimposed, non-linearly controlled hysteresis.

As it was already explained above, in practice, frequently distance variations for example due to vibrations between the providing object and the switching sensor building block may not be prevented, so that accordingly varying signal courses of the sensor signal may occur. Such varying signal courses are for example the sensor signal courses illustrated in FIGS. 6a–6d determined in practice comprising proportionally different (normalized) sensor signal values with certain rotational angles of the providing object, e.g. a gear wheel, as it is to be illustrated by the arrows illustrated in FIGS. 6a–6d. The different distances between the different signal courses result from different or varying intervals between the switching sensor building block and the providing object, respectively. These differences may be explained by distance-conditioned signal shape changes.

With great distances between the magnetic field sensor elements of the switching sensor and the providing object and correspondingly small sensor signals, more sinusoidal sensor signal courses result. In a fixed or proportionally fixed hysteresis, as it is proposed in the prior art, these variations may not be considered. As here the fixed y axis values determine the switching points of a comparator means, according to the prior art phase errors result, i.e. deviations on the x axis. If now, according to the invention, a variable non-linear percentage for setting the switching points (comparison values) and thus according to the invention a non-linear amplitude-dependent hysteresis for the comparator arrangement is used, it is now due to this possible according to the invention, in contrast to the prior art, to reduce the deviations on the x axis or in the ideal case eliminate the same completely.

Thus, the percentage of the amplitude with the amplitude course itself is again changed or adjusted, respectively, after a preset "non-linear" function. This function or non-linearity, respectively, may now be "suitably" adjusted to the special switching sensor arrangement, e.g. to the type of the providing object, gear wheel, gear rod, camshaft, etc., or to the type of the switching sensor building block, whereby the distance sensitivity of the switching points of the comparator arrangement may be reduced or eliminated.

This inventive proceeding for evaluating a sensor signal comprises a plurality of advantages compared to the hitherto known proceedings of the prior art.

According to the invention, by this smaller phase errors in all amplitudes of the sensor signal may be achieved, which leads to a lower interval sensitivity of the phase error. It is further extremely advantageous in the inventive concept or system, respectively, for evaluating a sensor signal, that for its realization regarding circuit technology hardly any additional technical effort is required in contrast to the known circuit arrangements.

Further, it is now possible according to the invention, that any programmable non-linearities (for setting the differences between the comparison values or switching points of the comparator arrangement, respectively) may consider the rather sinusoidal course of the sensor signal with small signal amplitudes and the rather peak-shaped course of the sensor signal with large signal amplitudes. By this, realizations with considerably less phase errors are possible, as the same may provide the switching sensor arrangements known in the prior art.

In addition to this, by the present invention, any desired non-linearity may be adjusted to the changing signal shape of the sensor signal. This way, the switching points may be laid to a steep or steeper location of the signal course, respectively, of the sensor signal, whereby the signal jitter may be reduced. A lower signal jitter is thus expressed according to the present invention in a lower signal noise or a higher repeat accuracy from tooth to tooth or per revolution of the providing object.

BRIEF DESCRIPTION OF THE DRAWINGS

In the following, preferred embodiments of the present invention are explained in more detail with reference to the accompanying drawings, in which.

DETAILED DESCRIPTION

Figure 1:
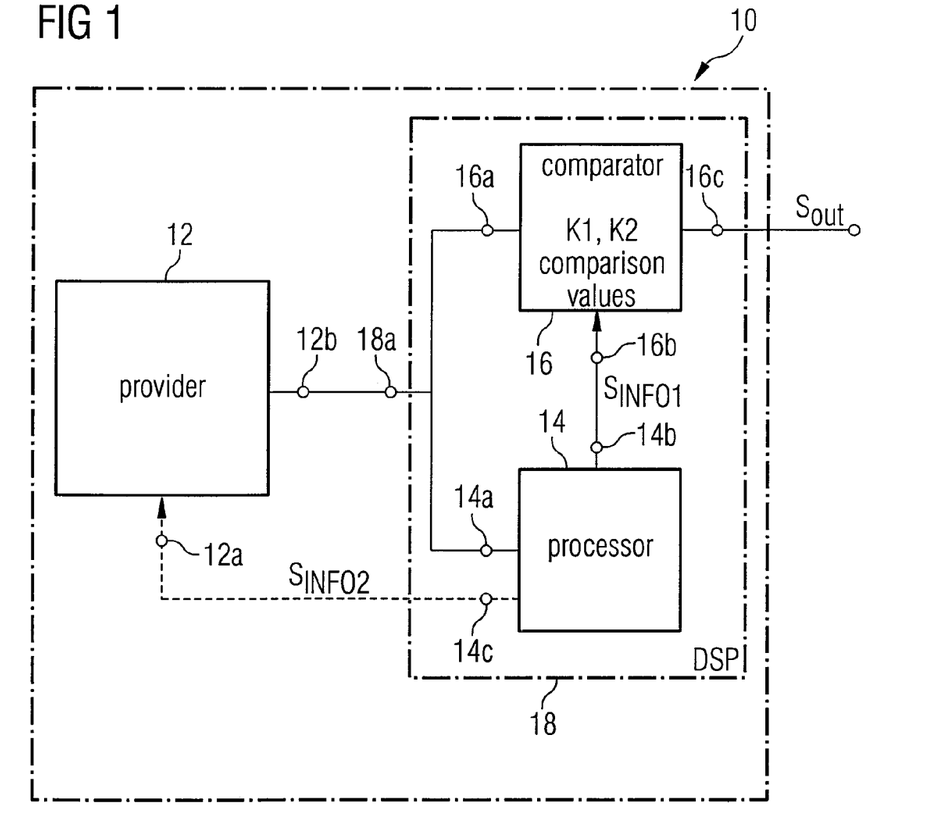
FIG. 1 shows a general, fundamental illustration of a device for evaluating a sensor signal according to the present invention.

With reference to FIG. 1, now a first inventive embodiment of a device for evaluating a sensor signal 10 (in the following also simply referred to as a switching sensor arrangement 10) is described in principle.

As it is illustrated in FIG. 1, the inventive switching sensor arrangement 10 includes means 12 for providing the sensor signal $S_{SIG}$ having an optional input terminal 12a and an output terminal 12b, means 14 for processing the sensor signal and for providing a first information signal $S_{INFO1}$ or a second optional information signal $S_{INFO2}$ having an input terminal 14a, a first output terminal 14b and a second optional output terminal 14c and means 16 for comparing the sensor signal to a first and a second comparison value K1, K2 having a first input terminal 16a, a second input terminal 16b and an output terminal 16c.

As it is illustrated in FIG. 1, the processing means 14 and comparison means 16 are on the input side connected to the sensor signal provisioning means 12, wherein the processing means 14 provides the first information signal $S_{INFO1}$ to the comparison means and optionally the second information signal $S_{INFO2}$ to the sensor provisioning means. The output terminal 16c of the comparison means 16 preferably simultaneously forms the output terminal of the switching sensor arrangement 10 for providing the output signal $S_{OUT}$.

As it is explained in more detail in the following, the processing means 14 and the comparison means 16 may be implemented as a common digital building block 18 and in particular as a digital signal processor DSP for example using a microprocessor.

In the following now the basic functioning of the functional elements of the inventive switching sensor arrangement 10 illustrated in FIG. 1 are explained in more detail.

If a magnetic field sensor means (not shown in FIG. 1) is arranged external to the sensor signal provisioning means 12, means 12 may be implemented for providing the sensor signal $S_{SIG}$ in the simplest case as a simple terminal face in order to connect the inventive switching sensor arrangement 10 to the externally arranged magnetic field sensor means in order to provide a preferably analog sensor signal $S_{SIG}$ for the inventive switching sensor arrangement 10. It is of course also conceivable that the sensor signal $S_{SIG}$ is already provided in digital form. The sensor signal provisioning means may thus (in the simplest case) be provided as a hardware or software interface for providing the (externally) determined sensor signal.

Typically, however, already a magnetic field sensor means having an optional sensor signal rendering means is associated with the sensor signal provisioning means 12 within the inventive switching sensor arrangement 10.

The magnetic field sensor means associated with the sensor signal provisioning means 12 provides the sensor signal $S_{SIG}$ to be evaluated based on a magnetic field component penetrating this magnetic field sensor means. The already provided sensor signal here comprises information about a relative position or movement of an object influencing or generating the magnetic field component, in the following also referred to as a providing object or providing structure, with reference to the magnetic field sensor means.

As a providing object, in general any object made of a ferromagnetic or permanent-magnet material is regarded which influences or generates the present magnetic field in its environment or generates a corresponding magnetic field.

According to the present invention it should be considered that the inventive device and the inventive method for evaluating a sensor signal may preferably be used in applications in which a magnetic field for detecting a relative position, speed or revolution, respectively, and direction or rotational direction, respectively, of the providing object is used with regard to the magnetic field sensor means. Thus, for example according to the invention, as providing objects so-called gear wheels or gear rods in relation to a backbias magnet or also so called magnet wheel applications, like e.g. magnet wheels or magnet rods having magnetized poles may be used. In the above-mentioned applications, a so called "pitch" distance is defined as a distance between different teeth or different magnetized poles, respectively.

The magnetic field sensor means comprises at least one individual magnetic field sensor element in case of a mono-cell arrangement and preferably two or more magnetic field sensor elements in case of differential sensors. Preferably, two magnetic field sensor elements are used in order to form together a so called differential magnetic field sensor means. The output signal of a differential magnetic field sensor means is preferably the difference of two output signals of two single sensor elements, so that the sensor signal reproduces a differential magnetic flow density which is influenced or generated by the providing object and penetrates the magnetic field sensor means.

As magnetic field sensor elements, basically any magnetic field sensitive elements may be used, like e.g. Hall sensor elements, xMR sensor elements (AMR, GMR, TMR, CMR sensor elements; AMR=anisotropic magneto resistance, GMR=giant magneto resistance, TMR=tunnel magneto resistance, CMR=colossal magneto resistance), magneto-resistors, magneto-transistors (MAGFETs), giant planar Hall effect sensor elements, spin transistors, GMI elements (GMI=giant magnetic impedance) or magnetic diodes. It should be considered, however, that the above enumeration is not to be considered as exhaustive, wherein with regard to the present invention basically any magnetic field sensitive elements may be used.

Optionally, a sensor signal rendering arrangement may be associated with the magnetic field sensor means, for example performing an amplitude, effective value or mean value determination with regard to the sensor signal $S_{SIG}$ to be provided. Thus, for example by the sensor signal rendering means, a determination of the offset proportion or a removal of the offset proportion of the sensor signal $S_{SIG}$ may be performed in order to provide an offset-corrected sensor signal. Further, the sensor signal rendering means may be implemented in order to perform a filtering, e.g. a low-pass filtering, of the sensor signal for removing interfering signal peaks or signal superimpositions.

It should be noted, however, that this sensor signal rendering may also be performed in the digital part 18 (DSP), as it is optionally illustrated in FIG. 1, in order to for example provide the optional second information signal $S_{INFO2}$, for example comprising amplitude, effective value or mean value information in order to perform the sensor signal rendering based on this information signal.

According to the invention it is also possible, however, that the sensor signal rendering is performed by means of a digital signal processor using suitable software means (software programs).

In the following, now the basic functioning of the processing means 14 and the comparison means 16 illustrated in FIG. 1 and their mutual cooperation is discussed according to the present invention.

The sensor signal processing means 14 is now implemented in accordance with the invention in order to on the one hand process the provided preferably analog (or also) digital sensor signal $S_{SIG}$ and to provide a first information signal $S_{INFO1}$ comprising information regarding the amplitude course of the sensor signal $S_{SIG}$. The sensor signal comparison means 16 is now implemented in order to compare the sensor signal $S_{SIG}$ to a first and a second comparison value K1, K2, wherein the sensor signal comparison means 16 is further implemented in order to output a sensor output signal $S_{OUT}$ in the form of a first comparison signal or a first (logical) comparison signal value, respectively, if the sensor signal exceeds the first comparison value, and output the same in the form of a second comparison signal or a second (logical) comparison signal value or level, respectively, if the sensor signal $S_{SIG}$ falls below the second comparison value K2.

According to the present invention, now at least one comparison value, i.e. the first and/or the second comparison value K1, K2 is set based on the first information signal $S_{INFO1}$ such that the difference, i.e. the hysteresis, between the first and the second comparison value K1, K2 has a non-linear relation to the amplitude course of the sensor signal.

The first comparison signal or the first logical comparison signal value, respectively, and the second comparison signal or the second logical comparison signal value, respectively, may now be provided as the output signal $S_{OUT}$ of the switching sensor arrangement 10 at the switching sensor arrangement output.

With regard to the present invention, now for example the following proceedings for obtaining a non-linear connection between the programmable first and/or second comparison value K1, K2 and the amplitude course of the sensor signal may be predetermined. As it was already indicated above, the first or optional, respectively, second information signal $S_{INFO1}$, $S_{INFO2}$ may comprise information about the (current or averaged across several periods) amplitude course, effective value and/or mean value of the sensor signal $S_{SIG}$.

According to the present invention it is now possible, on the one hand, that means 14 for processing the sensor signal $S_{SIG}$ is implemented such as to provide the information signal $S_{INFO1}$ already comprising a non-linear relation to the amplitude course of the sensor signal $S_{SIG}$, wherein at least one comparison value K1, K2 of the comparison means 16 is directly set based on this information signal $S_{INFO1}$.

One further alternative is that the sensor signal processing means 14 transmits the information signal $S_{INFO1}$ with the current information regarding the amplitude course of the sensor signal to the sensor signal comparison means 16, wherein now the sensor signal comparison means 16 is implemented in order to render the provided information signal $S_{INFO1}$ provided for setting at least one comparison value K1, K2 in a non-linear way and to set the first and/or the second comparison value K1, K2 based on the rendered information signal $S_{INFO1}$ so that in this way a non-linear connection between the interval between the first and the second comparison value K1, K2 and the current amplitude course of the sensor signal is present.

With regard to the present invention it should be noted that the setting of at least one comparison value K1, K2 of the comparison means 16, based on a non-linear relation to the amplitude course of the sensor signal, may also be related to the determined effective value or mean value or to another characteristic value of the signal course of the sensor signal, like e.g. also to an amplitude averaged across several periods or to an interference peak filtered amplitude by a comparison across several amplitudes.

With regard to the inventive device illustrated in FIG. 1 for evaluating a sensor signal $S_{SIG}$ it should further be noted that the comparison values K1, K2 which may for example be regarded as switching thresholds of a comparator means, may be readjusted across a suitable number of amplitude peak values of the sensor signal $S_{SIG}$. Thus, it is for example advantageous for a sensor signal with gradually changing amplitude peak values to set the comparison values K, K2 across a greater number of amplitude peak values of the sensor signal, i.e. across a greater number of signal periods of the sensor signal.

A fast comparison value regulation may for example only include one positive and negative peak of the signal (i.e. only one min-max-pair), wherein a slower comparison value regulation may for example include an averaging across 64 min-max-pairs. Thus, for example individual outliers in the averaging process may be ignored, wherein with several subsequently occurring great deviations in the same direction a readjusting may be performed immediately or as fast as possible.

Additionally, in the slow regulation a change of the hysteresis by at most one step may be admitted, whereby a further filtering takes place. Only with several subsequently occurring great deviations may a change of the hysteresis by several steps be admitted.

If now the signal course of the sensor signal $S_{SIG}$ changes quickly, i.e. with great signal jumps and a great dynamic of the sensor signal, it is advantageous now to set the comparison values K1, K2 of the sensor signal comparison means 16 across relatively few amplitude peak values of the sensor signal. In the extreme case, the comparison values K1, K2 of the sensor signal comparison means 16 may be readjusted with every period of the sensor signal.

With regard to the above embodiments of the inventive device or the inventive method, respectively, for evaluating a sensor signal $S_{SIG}$ it should be noted that the first and/or the second comparison value K1, K2 may be preferably used as switching thresholds (hysteresis) of a sensor signal comparison means 16 implemented as a comparator means. With regard to the present invention it should be noted, however, that for example only one comparison value of the sensor signal comparison means 16 may for example use the "differential" zero passings of the sensor signal through the determined mean value (or another characteristic value) of the sensor signal course. Thus, the present invention may also be implemented so that a comparison value or switching point, respectively, of the sensor signal comparison means 16 comprises a fixed or also a linearly-dependent control of the same, wherein the other comparison value or switching point, respectively, comprises a non-linear amplitude-dependent control. It should further be noted according to the present invention that the set "hysteresis" of the sensor signal comparison means 16 is generated non-linearly, but is used, however, as a so-called "hidden" hysteresis.

The setting of the hysteresis switching thresholds is regarded as a hidden hysteresis, in which for example zero passings of the sensor signal with regard to a reference threshold, for example a mean value of the sensor signal, are examined, wherein the corresponding output signal of the comparator means is only connected through, however, when the "hidden" hysteresis switching thresholds are exceeded or fallen short of, respectively.

In the following, now with reference to FIG. 2, a possible technical realization of the inventive device illustrated in FIG. 1 for evaluating a sensor signal using further functional elements is described in detail associated with the described general assemblies, i.e. the sensor signal provisioning means 12, the sensor signal processing means 14 and the sensor signal comparison means 16.

With regard to the following discussion of the inventive device 10 for evaluating a sensor signal $S_{SIG}$ it should be noted that in FIG. 2 for corresponding or like functional elements, respectively, as in FIG. 1 like reference numerals are indicated, wherein a repeated detailed description of these functional elements is omitted in the following for preventing repetitions.

Figure 2:
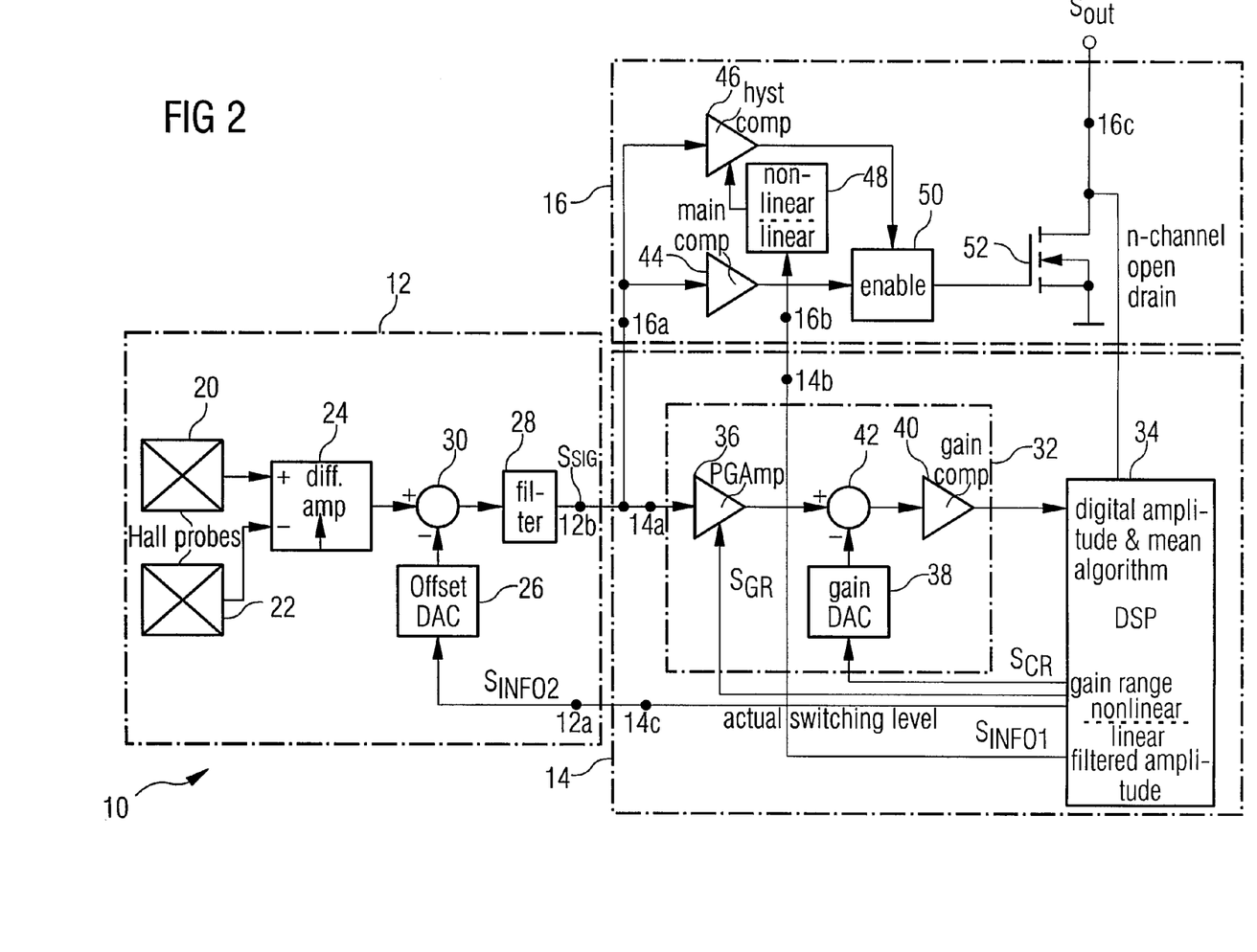
FIG. 2 shows a fundamental illustration by means of functional blocks of a possible realization of the inventive device for evaluating a sensor signal.

As it is illustrated in FIG. 2, the sensor signal provisioning means 12 of the inventive switching sensor arrangement 10 includes two Hall sensor elements 20, 22, a differential amplification means 24, an offset digital/analog converter means 26, a filtering means 28 and a combination means 30.

As it is illustrated in FIG. 2, the Hall sensor elements 20, 22 are on the output side respectively connected to one of the inputs (positive and negative input) of the differential amplification means 24. The differential amplification means 24 and the offset digital/analog converter means 26 are on the output side respectively connected to an input of the combination means 30, wherein the combination means 30 is connected to the optional filtering means 28. The offset digital/analog converter means 26 is on the input side optionally connected to the output terminal of the sensor signal processing means 14 in order to receive the optional second information signal $S_{INFO2}$. The output terminal of filtering means 28 now forms the output terminal of the sensor signal provisioning means 12 for providing the sensor signal $S_{SIG}$.

Also here it should be noted that the sensor signal provisioning means 12 may in the simplest case, in a magnetic field sensor means arranged externally to the sensor signal provisioning means 12, be provided as a hardware or software interface (junction) for providing the (externally) determined sensor signal $S_{SIG}$.

As it is further illustrated in FIG. 2, the sensor signal processing means 14 includes a tracking analog/digital converter means 32 and a digital processing means 34, e.g. a digital signal processor DSP. The tracking analog/digital converter means 32 further includes an amplification means 36 with a programmable (programmable) gain factor (PGA; PGA=programmable gain amplifier), a gain digital/analog converter means 38 (gain DAC), a gain comparator means 40 (gain comparator) and a second combination means 42.

As it is illustrated in FIG. 2, the tracking analog/digital converter means 32 is connected on the input side to the output terminal of the sensor signal provisioning means 12, wherein the tracking analog/digital converter means 32 may further be provided with a control signal or several control signals (see FIG. 2) from the digital circuitry 34, and the tracking analog/digital converter means 32 is connected to the digital circuitry 34 on the output side.

As it is further illustrated in FIG. 2, the tracking analog/digital converter means 32 further includes different functional circuit elements, wherein the amplification means 36 with programmable gain factor is on the input side connected to the output terminal of the sensor signal provisioning means 12. Further, a control signal $S_{GR}$ (gain range signal) of the digital circuit arrangement 34 may be supplied to a control input of the amplification means 36 for setting the gain factor. The gain digital/analog converter means 38 is controllable at a control input with a further control signal $S_{CR}$ of the digital circuit arrangement 34, wherein the amplification means 36 and the converter means 38 are on the output side connected to the second combination means 42. The second combination means 42 is now in turn connected to an input terminal of the gain comparator means 40 on the output side which is in turn connected to the digital circuitry 34 on the output side.

As it is further illustrated in FIG. 2, the sensor signal comparator means 16 includes a main comparator means 44, a hysteresis comparator means 46, a hysteresis setting means 48, an (optional) enabling means 50 and a sensor signal output means 52. The sensor signal output means 52 is for example implemented as an open drain n channel field effect transistor. As it is illustrated in FIG. 2, both the main comparator means 44 and the hysteresis comparator means 46 are on the input side connected to the output terminal of the sensor signal provisioning means 12. The main comparator means 44 and the hysteresis comparator means 46 are now on the output side connected to the (optional) enabling means 50, which is in turn on the output side connected to the sensor signal output means 52. The hysteresis setting means 48 is now on the input side connectable to a further control signal, i.e. the first information signal $S_{INFO1}$ of the digital circuit arrangement 34, wherein the hysteresis setting means 48 is on the output side connected to a control input of the hysteresis comparator means 46.

In the following now the functioning of the switching sensor arrangement 10 illustrated in FIG. 2 is explained in more detail.

As it is illustrated in FIG. 2, the two Hall sensor means 20, 22 respectively generate an output signal according to the magnetic field component penetrating the same (vertical magnetic field component in a planar magnetic field sensor means). The differential amplification means forms a differential signal between the two output signals of the Hall sensor elements 20, 22 and provides this differential signal to the combination means 30. This differential signal has for example a peak (a signal peak) when for example the edge of a cog of a gear wheel or a cam of a cam wheel is positioned between the two Hall sensor elements 20, 22.

The offset digital/analog converter means 26 provides an offset compensation signal to the first combination means 30 which is based on the control signal (actual switching level), i.e. the second information signal $S_{INFO2}$, supplied to the offset digital/analog converter means 26 from the digital circuitry 34. Thereby, an offset-corrected differential signal is provided by the combination means 30. The offset digital/ analog converter means 26 thus controls only the mean value of the compensation signal, wherein the converter means 26 is not controlled by the differential signal itself but via the digital circuitry 34 by the difference of the differential signal minus the compensation signal. As it may further be seen from FIG. 2, the control of the offset digital/analog converter means 26 is performed in a sub-branch of the switching sensor arrangement 10 and not in the main signal branch of the switching sensor arrangement 10. Further, the offset digital/analog converter means 26 or the digital circuitry 34 controlling this converter means 26, respectively, is for example implemented so that not necessarily each maximum or minimum of the sensor signal leads to a new value of the offset compensation signal.

In summary it may be said that between the two Hall sensor elements 20, 22 a differential signal results with a magnetic field gradient by the providing object (not shown in FIG. 2), as they for example occur in gear wheel sensor elements. The differential signal is amplified and corrected with regard to the mean value by subtracting the offset signal determined across several periods with the help of the offset digital/analog converter means 26 and the combination means 30 from the basis differential signal. The mean value of the sensor signal determined across several periods is determined in the digital circuitry 34 by a suitable processing algorithm.

The offset-corrected differential signal is now for example supplied to the filter means 28 for removing interference signals or interference signal peaks, respectively, in order to obtain the sensor signal $S_{SIG}$ to be finally processed. This sensor signal $S_{SIG}$ is analog/digital converted by the tracking analog/digital converter means 32, wherein the output signal of the tracking analog/digital converter means 32 forms the input signal for the digital circuit arrangement 34. As it is illustrated in FIG. 2, the tracking analog/digital converter means is here for example formed by the amplification means 36 with programmable gain, the amplification or gain digital/analog converter means 38, the amplification or gain comparator means 40, the second combination means 42 and several associated control circuit elements in the digital circuitry 34.

This input signal at the input terminal of the amplification means 36 (PGA) is derived from the offset-corrected output signal of the summation location 30, which is again low-pass filtered in the filtering means 38 in order to for example reduce noise components and interference signals.

The tracking analog/digital converter means 32 follows the (filtered and off-set-corrected) sensor signal $S_{SIG}$ at very high speed. The amplification means 36 with programmable gain (PGA) amplifies the signal e.g. with a small signal amplitude of the same, wherein the gain of the amplification means 36 is controlled via the control signal (gain range signal) of the digital circuitry 34. The amplification means 36 with programmable gain may for example be binarily weighted, wherein the programmable gain of the amplification means 36 may comprise a relatively coarse, binary weighting (e.g. 1.5; 3; 6; 12; 24; 48 . . . ) or also finer digital increments of the gain (e.g. 256; 255; 254; . . . 7; 6; 5; 4; . . . ). The control signal (gain range signal) of the digital circuitry 34 may thus for example comprise seven coarse settings depending on the signal amplitude of the sensor signal $S_{SIG}$ or for example also 256 settings depending on the signal amplitude of the sensor signal.

The above increments of the amplification factor are to be regarded merely as an example, as in practice depending on the realization of the amplification means 36 basically any increments may be used.

Thus, the gain range signal from the digital circuitry in a coarse (logarithmic) approach also contains the signal amplitude information. The tracking analog/digital converter means 32 thus forms a binarily weighted amplifier. The amplification comparator means 40 now converts the signal applied to its input terminal in an analog-digital way. The amplification digital/analog converter means 38 follows the (digitized) sensor signal provided by the digital circuitry 34 digitally on the input side and analogously on the output side, as a differential formation at the second combination means (summation location) takes place and a feedback loop via the amplification comparator means 40 and the digital circuitry 34 exists.

The amplification digital/analog converter means 38 and the amplification comparator means 40 thus, in connection with the digital circuitry 34, form a digital peak value determination of the sensor signal. This peak value determination has a limited dynamic range, however.

Above, the sensor signal rendering and processing in the "sub-branch" of the inventive switching sensor arrangement 10 is discussed.

In the following, now the further rendering and processing of the sensor signal in the "main branch" of the inventive switching sensor arrangement 10 is explained in more detail.

The (filtered and offset-corrected) sensor signal $S_{SIG}$ is also supplied to the main comparator means 44, wherein based on the output signal of the main comparator means 44 the output of the switching sensor means 10 is switched digitally or the output signal $S_{OUT}$ of the inventive switching sensor means 10 is provided, respectively.

According to the invention this now happens with a programmable hysteresis provided by the hysteresis comparator means 46. Here, a comparison value may for example be a zero passing of the offset-corrected and filtered sensor signal with regard to a determined mean value of the sensor signal $S_{SIG}$, wherein the other comparison value is readjusted non-linearly depending on the amplitude.

In the first above-mentioned case, now the optional enabling means 50 for example serves for generating a so called "hidden hysteresis" in order to suppress an undesired frequent toggle switching of the main comparator means 44. Only when exceeding or falling below the programmable hysteresis thresholds is a switching back of the main comparator means 44 to the outside visibly enabled.

In the second above-mentioned case (with a adjustable hysteresis) the adjustable switching thresholds K1, K2 of the hysteresis comparator means 46 are directly operable to the exterior for providing the output signal $S_{OUT}$.

The essential issue with the present inventive switching sensor arrangement 10 is now that the switching hysteresis is generated in the hysteresis comparator 46 so that a non-linear connection between at least one switching threshold (comparison value K1 and/or K2) of the adjustable hysteresis and the amplitude course of the sensor signal $S_{SIG}$ is generated. An inventive possibility for generating the non-linear hysteresis is now that the non-linear hysteresis is generated in the hysteresis comparator means 46 by a non-linear digital/analog converter converting the information signal $S_{INFO1}$ having also a linear relation to the amplitude course of the sensor signal $S_{SIG}$ according to the invention in a non-linear way in order to generate the non-linear switching hysteresis in the hysteresis comparator means 46.

According to this first possibility, in the digital circuitry 34, which is for example implemented as a digital signal processor, a digital amplitude and mean value algorithm for determining the algorithm course, the mean value or the effective value of the sensor signal $S_{SIG}$ is used in order to for example provide a filtered amplitude course of the sensor signal $S_{SIG}$ as a control signal for the non-linear hysteresis comparator means 46 as the first information signal $S_{INFO1}$.

Thus, as in the digital circuitry 34 the amplitude course, the effective value or the mean value of the sensor signal are determined, across the information signal $S_{INFO1}$ which is operative as the control signal for the non-linear hysteresis comparator means 46, a hysteresis changing non-linearly with the amplitude course results in the magnetic switching points of the comparison means 16 of the inventive switching sensor arrangement 10.

A further possibility in order to set the switching thresholds (comparison values K1, K2) of the hysteresis comparator means 46 in a non-linear way with the amplitude course of the sensor signal $S_{SIG}$ is now that the digital circuit arrangement 34 provided in order to determine, by means of a digital amplitude and mean value algorithm for example the amplitude course, mean value or effective value of the sensor signal $S_{SIG}$ in a digital way, is now used in order to introduce a non-linearity into the information signal $S_{INFO1}$. Thus, for example a filtered, non-linearly rendered signal course of the sensor signal $S_{SIG}$ may be provided as an information signal $S_{INFO1}$, so that for example a linear hysteresis comparator means 46 may be used with the non-linear information signal $S_{INFO1}$ in order to generate a non-linear switching hysteresis with regard to the amplitude course of the sensor signal $S_{SIG}$.

The non-linearity is thus in this case for example introduced into the information signal $S_{INFO1}$ by the digital circuit arrangement 34.

With regard to the digital amplitude course and the mean value determination algorithm performed by the digital circuitry 34 it should be noted that the offset determination of the sensor signal or the mean value determination or the amplitude course or effective value determination, respectively, of the sensor signal in the digital circuit arrangement 34 has to take place not only from one signal peak and one signal value of the sensor signal and thus via half a signal period of the sensor signal $S_{SIG}$, but is preferably filtered across several signal periods of the sensor signal $S_{SIG}$, i.e. for example across several teeth of a gear wheel, in order to obtain a filtered mean value of the amplitude course of the sensor signal $S_{SIG}$.

A further possibility for generating a non-linear switching hysteresis for a hysteresis comparator means 46, wherein at least one adjustable switching threshold (an adjustable comparison value K1, K2) comprises a non-linear relation to the amplitude course of the sensor signal $S_{SIG}$, is now not to use the digitally high-resolved (filtered) digital amplitude signal of the digital circuitry 34 as the information signal $S_{INFO1}$ for controlling the hysteresis comparator means 46 (the non-linear hysteresis digital/analog converter means), but the far less digitally resolved control signal for the amplification means 36 with a programmable gain, as also this control signal (gain range signal) contains amplitude information regarding the signal course of the sensor signal $S_{SIG}$. In the "gain range" signal in a coarse logarithmic approximation also the amplitude information of the sensor signal is contained. As already indicated above, the gain range control signal may in a coarse gradation for example comprise seven binary weightings and in a finer digital gradation for example 256 binary weightings.

By this alternative, a further simplification of the circuit arrangement of the inventive switching sensor arrangement 10 is facilitated.

It should of course be obvious that the amplification means 36 with programmable gain may also comprise a non-linear connection between the gain and the digital code of the control signal from the digital circuit arrangement 34, so that the PGA digital code simultaneously controls the non-linear hysteresis of the hysteresis comparator means 46 which may in this case be implemented as a linear hysteresis digital/analog converter means.

In the present inventive switching sensor arrangement 10 it is now especially advantageous that the non-linearity of the switching hysteresis provided by the hysteresis comparator means 46 may now suitably be selected exactly so that the phase error when switching at tooth flanks may be kept as low as possible with a changing amplitude of the sensor signal. Changes of distance, for example due to vibrations, between the switching sensor arrangement 10 and the providing object (e.g. the gear wheel) do not only influence the signal amplitude, as is commonly known, but also the signal shape of the sensor signal $S_{SIG}$, and usually lead to phase errors when a constant hysteresis or proportional amplitude-dependent hysteresis is used, as it is in the case with the hitherto known switching sensor arrangement in the prior art.

According to the invention, now the non-linearity of the switching hysteresis may be tuned to the special type of the providing object (e.g. gear wheel type) or also the respective sensor module (switching sensor arrangement 10), whereby by the inventive switching sensor arrangement the distance sensitivity of the switching points of the switching hysteresis may be clearly reduced or even completely eliminated.

The determination of the (most possible) optimum non-linearity, i.e. the non-linear function for controlling at least one switching point of the switching hysteresis, may e.g. be performed in advance by a test setup and then be provided for the further operation by storing in hardware, in a PROM element (PROM=programmable read-only memory) or an EEPROM element (EEPROM=electrically erasable programmable read-only memory), by storing for a certain sensor object (e.g. gear wheel for all sensors by distance variation tests) or by storing for an individual sensor by distance variations in the final assembly of the sensor system of the respective switching sensor arrangement.

The determination of the optimum non-linearity may for example also take place adaptively during the operation in order to be able to consider signal amplitude changes or signal shape changes of the sensor signal course, respectively, also later by controlling to a certain pulse-pause ratio at the output of the switching sensor arrangement.

Thus, the present invention provides an extremely advantageous switching sensor arrangement 10 with a non-linear adaptive hysteresis or hidden hysteresis, respectively.

With regard to the switching sensor arrangement 10 illustrated with reference to FIG. 2 it should be noted, that a switching point of the switching hysteresis may use the so-called differential zero passing of the sensor signal for the comparison means 16, i.e. for example the zero passing with regard to the mean value of the sensor signal. It should further be noted, that according to the inventive switching sensor arrangement 10, for example a switching point of the switching hysteresis comprises a fixed or linearly dependent control with regard to the amplitude course, wherein the other switching point of the switching hysteresis comprises a non-linear amplitude-dependent control or setting, respectively.

With regard to the present invention, as it was described with reference to FIGS. 1 and 2, it should further be noted that the sensor signal processing means 14 and the sensor signal comparison means 16 may be implemented partially or completely by a digital circuit arrangement and preferably a digital signal processor having a software programming means, so that for the case that the sensor signal processing means 14 and the sensor signal comparison means 16 are only formed as a non-linear computing circuit, the output signal output means 52 (output transistor) is directly controlled by the non-linear computing circuit.

In the following, now with reference to FIG. 3, a further embodiment of the inventive switching sensor arrangement 10 is explained.

Figure 3:
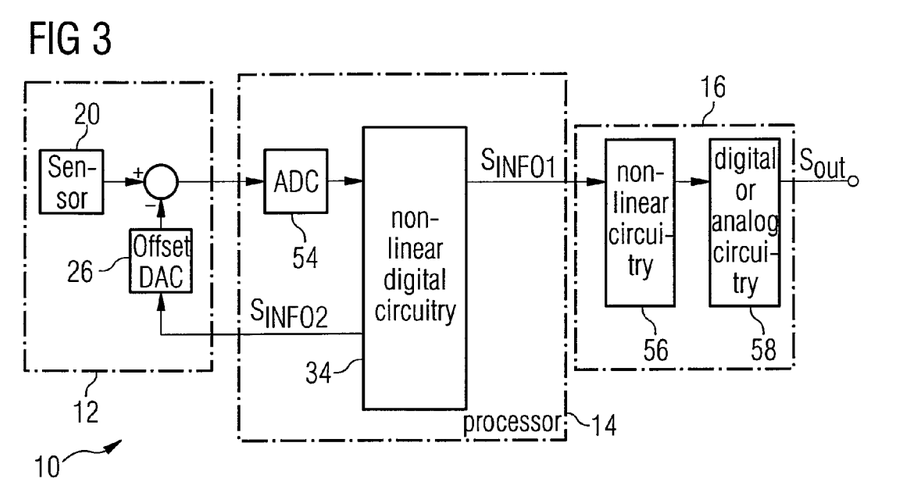
FIG. 3 shows a fundamental illustration by means of functional blocks of a further possible realization of the inventive device for evaluating a sensor signal.

As it is illustrated in FIG. 3, the switching sensor arrangement 10 includes again means 12 for providing the sensor signal, means 14 for processing the sensor signal and means 16 for comparing the sensor signal to a first and a second comparison value.

Further, the sensor signal provisioning means 12 further optionally includes the sensor means and the sensor signal rendering means, as it was already described as an example with reference to FIG. 2.

The sensor signal processing means 14 in the embodiment illustrated in FIG. 3 includes an analog/digital converter for analog/digital converting the sensor signal $S_{SIG}$ and further a digital circuitry 34. The non-linear digital circuitry 34 has a downstream sensor signal processing means 16, wherein the same, in the embodiment illustrated in FIG. 3, comprises a non-linear circuitry 56 and a digital or analog circuitry 58 for providing a switching hysteresis. From the inventive switching sensor arrangement 10 illustrated in FIG. 3 it becomes clear that there, in contrast to the switching sensor arrangement 10 illustrated in FIG. 2, the offset portion or the mean value and the amplitude of the sensor signal not is determined in the sub-signal branch (see tracking analog/digital converter means 32 and the digital circuitry 34 of FIG. 2), but that in the embodiment of the switching sensor arrangement 10 illustrated in FIG. 3 the analog/digital converter means 54 is now in the main signal path and subsequently a non-linear amplitude-dependent hysteresis is generated by a non-linear characteristic line (analog or digital) with the help of two threshold values.

According to this embodiment, the non-linear circuitry 56 now generates the non-linearity and the normalization of the sensor signal to 100% of the signal course, wherein this may be performed analogously or digitally. The digital or analog circuitry 58 for providing a switching hysteresis generates the switch-over of the sensor output signal with a hysteresis of the input signal, wherein also this may take place in an analog or digital way. Also in this embodiment, first of all a comparison value K1, K2 of the switching hysteresis or also of a hidden hysteresis is rendered in a non-linear way in order to set the first and/or the second comparison value K1, K2 based on the evaluated amplitude course of the sensor signal, so that in this way a non-linear connection between the distance of the first and the second comparison value K1, K2 and the (preferably current) amplitude course of the sensor signal is present.

At it was already indicated above, depending on the conditions the inventive proceeding for evaluating a sensor signal may be implemented in hardware or also in software. The implementation may take place on a digital storage medium, in particular a floppy disc or a CD with electronically readable control signals that may thus cooperate with a programmable computer system or microprocessor system, respectively, so that the corresponding inventive method is performed. In general, the invention thus also consists in a computer program product with a program code stored on a machine-readable carrier for performing the inventive method when the computer program product runs on a computer or a microprocessor, respectively. In other words, the invention may thus be realized as a computer program with a program code for performing the method when the computer program runs on a computer or a microprocessor system, respectively.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

We claim:

1. A device for evaluating a sensor signal with respect to a relative position or movement between an indicator object and a sensor, comprising:
   a provider for providing the sensor signal;
   a processor for processing the sensor signal to provide an information signal comprising information regarding the amplitude course of the sensor signal, wherein the processor is connected to the provider to receive the sensor signal; and
   a comparator for comparing the sensor signal to a first and a second comparison value to provide a comparison signal, wherein the comparator is connected to the provider to receive the sensor signal and to the processor to receive the information signal;
   wherein the first and/or the second comparison value are adjustable based on the information signal, such that a difference between the first and the second comparison value comprises a non-linear relation to the amplitude course of the sensor signal.

2. The device according to claim 1, wherein the comparison signal has a first logic level if the sensor signal exceeds the first comparison value, and the comparison signal has a second logic level if the sensor signal falls below the second comparison value, wherein the comparison signal is indicative of the relative position or movement of the indicator object with respect to the sensor.

3. The device according to claim 1, wherein the processor for processing is implemented so that the information signal comprises a non-linear relation to the amplitude course of the sensor signal.

4. The device according to claim 1, wherein the comparator for comparing is implemented in order to render the information signal non-linearly with regard to the amplitude course of the sensor signal and to set the first and/or the second comparison value based on the rendered information signal.

5. The device according to claim 1, wherein the processor for processing is implemented in order to generate the information signal based on an amplitude value, an effective value or a mean value of the sensor signal.

6. The device according to claim 1, wherein the first and/or the second comparison value are adjusted based on a plurality of subsequent signal amplitude values of the sensor signal.

7. The device according to claim 1, wherein the processor for processing and/or the comparator for comparing are implemented by a digital signal processor.

8. The device according to claim 1, wherein the difference formed by the first and the second comparison value forms a switching hysteresis or a hidden hysteresis for the sensor signal comparator.

9. The device according to claim 1, wherein the provider for providing the sensor signal is implemented in order to provide an offset-corrected sensor signal.

10. The device according to claim 9, wherein the provider for providing the sensor signal is implemented in order to provide the offset-corrected sensor signal based on the in-formation signal.

11. The device according to claim 1, wherein the provider for providing the sensor signal comprises a magnetic field sensor providing the sensor signal based on a magnetic field component penetrating the magnetic field sensor.

12. The device according to claim 11, wherein the sensor signal comprises information about a relative position or movement, with regard to the magnetic field sensor, of a providing object influencing or generating the magnetic field component.

13. The device according to claim 11, wherein the magnetic field sensor comprises a plurality of magnetic field sensor elements respectively providing a sensor element output signal, wherein the sensor signal is a differential signal of the output signals of at least two magnetic field sensor elements.

14. The device according to claim 1, wherein one of the first and second comparison values is based on the amplitude value, the effective value or the mean value of the sensor signal and a superimposed non-linear hysteresis value.

15. The device according to claim 14, wherein the other comparison value is a fixed comparison value or a comparison value linearly dependent on the amplitude course of the sensor signal.

16. The device according to claim 15, wherein a mean value of the sensor signal is selectable as the other comparison value.

17. The device according to claim 1, wherein the processor for processing comprises a signal tracking analog/digital converter for a digital peak value determination of the sensor signal and a digital circuitry for a determination of an amplitude, mean value and/or effective value of the sensor signal.

18. The device according to claim 17, wherein the signal tracking analog/digital converter comprises an amplifier with a programmable gain, wherein the programmable gain is programmable by means of a gain control signal provided by the digital circuitry.

19. The device according to claim 18, wherein the gain programming signal comprises a digital signal with a binary programmable weighting.

20. The device according to claim 18, wherein the gain programming signal is the information signal.

21. A magnetic field sensor arrangement, comprising a device for evaluating a sensor signal with respect to a relative position or movement between an indicator object and a sensor, comprising:
 a provider for providing the sensor signal;
 a processor for processing the sensor signal to provide an information signal comprising information regarding the amplitude course of the sensor signal, wherein the processor is connected to the provider to receive the sensor signal; and
 a comparator for comparing the sensor signal to a first and a second comparison value to provide a comparison signal, wherein the comparator is connected to the provider to receive the sensor signal and to the processor to receive the information signal;
 wherein the first and/or the second comparison value are adjustable based on the in-formation signal, such that a difference between the first and the second comparison value comprises a non-linear relation to the amplitude course of the sensor signal.

22. The magnetic field sensor arrangement according to claim 21, wherein the magnetic field sensor arrangement is implemented as a switching sensor.

23. A method for evaluating a sensor signal with respect to a relative position or movement between an indicator object and a sensor, comprising the following steps:
 processing the sensor signal to provide an information signal comprising information regarding the amplitude course of the sensor signal;
 comparing the sensor signal to a first and a second comparison value to provide a comparison signal based on the comparison; and
 adjusting the first and/or the second comparison value based on the in-formation signal such that a difference between the first and the second comparison value comprises a non-linear relation to the amplitude course of the sensor signal.

24. The method according to claim 23, wherein
 the comparison signal has a first logic level if the sensor signal exceeds the first comparison value, and the comparison signal has a second logic level if the sensor signal falls below the second comparison value, and wherein the comparison signal is indicative of the relative position or movement of the indicator object with respect to the sensor.

25. The method according to claim 23, wherein the step of processing and providing an information signal further comprises the following substep:
 providing the information signal comprising a non-linear relation to the amplitude course of the sensor signal.

26. The method according to claim 23, wherein the step of processing and providing an information signal further comprises the following substeps:
 non-linear processing of the information signal with regard to the amplitude course of the sensor signal; and
 setting the first and/or the second comparison value based on the rendered information signal.

27. The method according to claim 23, wherein in the step of processing the in-formation signal is generated on the basis of an amplitude value, effective value or mean value of the sensor signal.

28. The method according to claim 23, wherein in the sensor signal processing a signal tracking analog/digital conversion for a digital peak value determination of the sensor signal and a digital signal processing for the determination of the amplitude, mean value and/or effective value of the sensor signal is performed.

29. The method according to claim 23, wherein the first and/or the second comparison value are adjusted based on a plurality of consecutive signal amplitude values of the sensor signal.

30. The method according to claim 23, wherein the difference formed by the first and the second comparison value forms a switching hysteresis or a hidden hysteresis for the sensor signal comparison.

31. The method according to claim 23, further comprising the step of providing an offset-corrected sensor signal.

32. The method according to claim 31, wherein based on the information signal the offset-corrected sensor signal is provided.

33. The method according to claim 23, wherein a comparison value is based on an amplitude value, mean value or effective value of the sensor signal and a superimposed non-linear hysteresis value.

34. The method according to claim 33, wherein the other comparison value is a fixed comparison value or a comparison value which is linearly dependent on the amplitude course of the sensor signal.

35. The method according to claim 34, wherein a mean value of the sensor signal is selectable as the other comparison value.

36. A computer program having a program code which when executed controls a computer or a digital signal processor to perform a method for evaluating a sensor signal with respect to a relative position or movement between an indicator object and a sensor, comprising the following steps:
   processing the sensor signal to provide an information signal comprising information regarding the amplitude course of the sensor signal;
   comparing the sensor signal to a first and a second comparison value to provide a comparison signal based on the comparison; and
   adjusting the first and/or the second comparison value based on the in-formation signal such that a difference between the first and the second comparison value comprises a non-linear relation to the amplitude course of the sensor signal.

37. A computer program product having a program code stored on a machine-readable carrier which when executed controls a computer to perform a the method for evaluating a sensor signal with respect to a relative position or movement between an indicator object and a sensor, comprising the following steps:
   processing the sensor signal to provide an information signal comprising information regarding the amplitude course of the sensor signal;
   comparing the sensor signal to a first and a second comparison value to provide a comparison signal based on the comparison; and
   wherein the first and/or the second comparison value are adjustable based on the in-formation signal such that a difference between the first and the second comparison value comprises a non-linear relation to the amplitude course of the sensor signal.

38. A digital storage medium, in particular a floppy disc, having electronically readable control signals that cooperate with a programmable computer system or a digital signal processor such that a method for evaluating a sensor signal with respect to a relative position or movement between an indicator object and a sensor is performed, the method comprising the following steps:
   processing the sensor signal to provide an information signal comprising information regarding the amplitude course of the sensor signal;
   comparing the sensor signal to a first and a second comparison value to provide a comparison signal based on the comparison; and
   adjusting the first and/or the second comparison value based on the in-formation signal such that a difference between the first and the second comparison value comprises a non-linear relation to the amplitude course of the sensor signal.

* * * * *